Dec. 13, 1932.  E. R. PHELPS  1,891,009
ADVERTISING DEVICE
Original Filed April 7, 1931
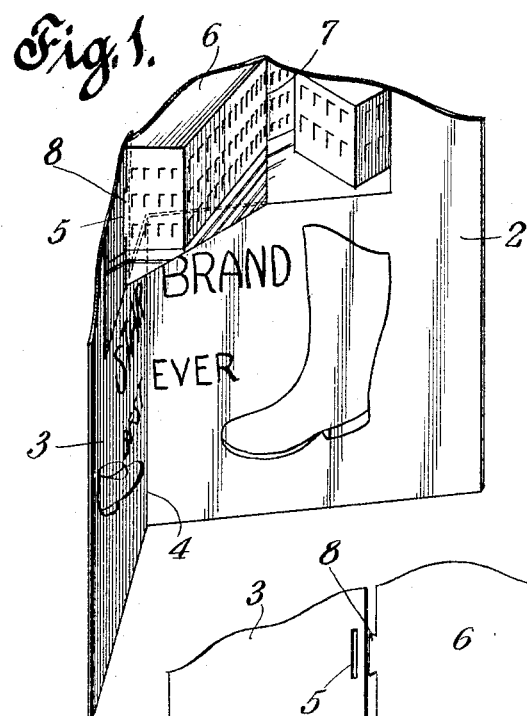
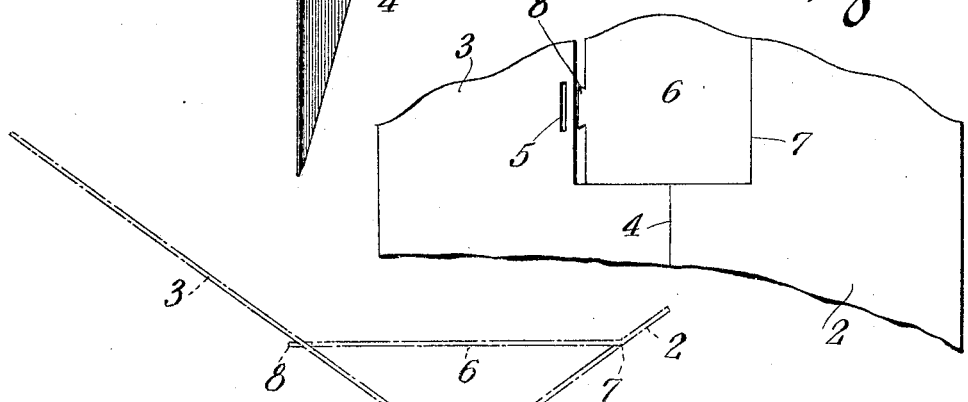
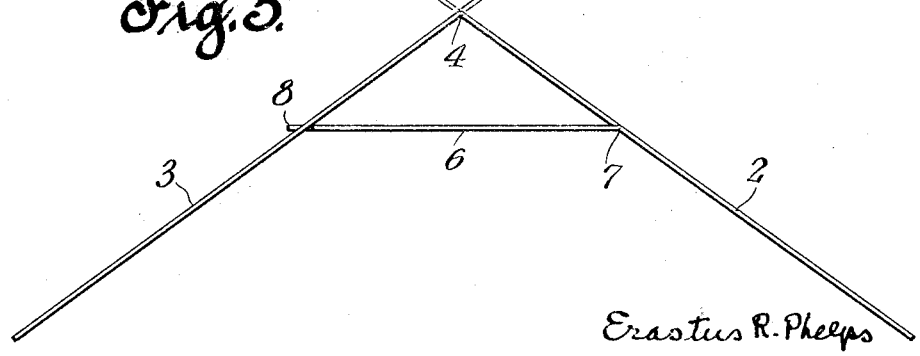
Erastus R. Phelps
INVENTOR
BY Wilbur M. Stone
his ATTORNEY Patented Dec. 13, 1932

1,891,009

UNITED STATES PATENT OFFICE

ERASTUS R. PHELPS, OF CHICAGO, ILLINOIS, ASSIGNOR TO AMERICAN LITHOGRAPHIC COMPANY, INC., OF NEW YORK, N. Y., A CORPORATION OF NEW YORK

ADVERTISING DEVICE

Application filed April 7, 1931, Serial No. 528,293. Renewed November 1, 1932.

This invention relates to advertising devices, and more particularly to a simple and economical device for displaying advertising matter so that it may be conveniently viewed from several directions or reversed to display either face.

It is customary to provide foldable cardboard devices upon which is printed advertising matter. However, the advertising matter has been printed on one side only of such devices, and they are effective only when viewed from the front, the rear of the device being blank and ineffective for advertising purposes. Also, usually the rear of the device is equipped with means for supporting the device in an upright position on a table or show case, and it is desirable to conceal, as far as possible, the unsightly appearance of the supporting means.

It is an object of this invention to provide an advertising device in the form of a foldable cardboard having advertising matter printed on both sides thereof suitable to be displayed with either face to the front.

A further object is the provision of an advertising device which may be conveniently adjusted to display advertising matter which may be printed on either side thereof.

These and other objects are attained by the novel structure and arrangement of parts hereinafter described and shown in the accompanying drawing, which forms a material part of this disclosure, and in which Figure 1 is a perspective view of the device. Fig. 2 is an elevational view of a portion of the upper center of the device. Fig. 3 is a plan view of the device, showing in dotted lines an alternate position of the device.

Referring to the drawing, the device is shown to include two boards 2 and 3, hinged together at 4, which may comprise scoring when the boards are cardboard.

Near the upper edge, the board 3 is provided with a slot 5, and the board 2 has hinged thereto at 7, a small board or link 6, provided with a tongue 8 arranged to enter the slot 5 to maintain the boards in a stable position due to the three-point connection. It is obvious that the boards 2 and 3, may be folded one way or the other, and be maintained in stable position by the small board or link 6 as shown in Fig. 3.

Both sides of the boards may bear advertising matter, and the small board 6 may be printed on both sides to conform with the printed matter on the boards 2 and 3.

From the above description it will be seen that there has been provided a simple and economical device which may be conveniently employed in numerous situations for advertising purposes.

The device is preferably formed from a sheet of cardboard which has a portion cut out of the upper edge at the center to form the small board or link 6. The board is then scored vertically at the center so that it may be folded.

The foregoing description is to be regarded as descriptive and not limitative or restrictive of the invention, of which modifications may be made without departing from the scope as indicated in the appended claim.

Having thus described the invention, what is claimed as new and desired to be protected by Letters Patent, is:

An advertising device consisting of a single sheet of material having a basal edge portion and a creased vertical fold line extending upwardly from the basal edge, the upper part of said sheet being cut downwardly from the upper edge in lateral spacing to one side of the fold line, there being a transverse slit extending from the lower end of the said cut and extending across the upper end of the fold line to a point in spaced relation to the fold line, said sheet further having a second creased fold line extending upwardly to the top edge of the sheet from the terminal end of the slit, said cut and slit partially severing a portion of the sheet from the body thereof to constitute a brace member, said body having a slot adjacent the said cut and the brace member being cut at its free edge to shorten the member and provide a tab adapted to engage in said slot to hold the parts of the body on opposite sides of the first fold line in angular relation, said body having a portion of the advertising matter to be displayed thereon and the brace member having correlated advertising thereon.

In witness whereof, I hereby affix my signature, this 31st day of March, 1931.

ERASTUS R. PHELPS.